(12) United States Patent
Singh et al.

(10) Patent No.: US 10,451,300 B2
(45) Date of Patent: Oct. 22, 2019

(54) SYSTEM AND METHOD FOR FACILITATING HOMOGENIZED DISTRIBUTION OF AIRFLOW IN A DATA CENTER

(71) Applicant: Tata Consultancy Services Limited, Mumbai, Maharashtra (IN)

(72) Inventors: Umesh Singh, Maharashtra (IN); Amarendra Kumar Singh, Maharashtra (IN); Anand Sivasubramaniam, Tamilnadu (IN)

(73) Assignee: Tata Consultancy Services Limited, Mumbai (IN)

( * ) Notice: Subject to any disclaimer, the term of this patent is extended or adjusted under 35 U.S.C. 154(b) by 401 days.

(21) Appl. No.: 15/003,872

(22) Filed: Jan. 22, 2016

(65) Prior Publication Data

US 2016/0215995 A1 Jul. 28, 2016

(30) Foreign Application Priority Data

Jan. 23, 2015 (IN) .......................... 246/MUM/2015

(51) Int. Cl.
*G06F 1/20* (2006.01)
*F24F 11/30* (2018.01)
(Continued)

(52) U.S. Cl.
CPC .............. *F24F 11/30* (2018.01); *F24F 11/62* (2018.01); *G05B 17/02* (2013.01); *G05D 7/0629* (2013.01); *G06F 17/50* (2013.01); *G06F 17/5009* (2013.01)

(58) Field of Classification Search
None
See application file for complete search history.

(56) References Cited

U.S. PATENT DOCUMENTS 6,747,872 B1 * 6/2004 Patel .......................... G06F 1/20
361/695
8,725,307 B2 5/2014 Healey et al.
(Continued)

FOREIGN PATENT DOCUMENTS

EP 2 688 003 1/2014

OTHER PUBLICATIONS

Daxten. (2014) "Best Practices for Airflow Management and Cooling Optimisation in the Data Centre," located at <http://www.daxten.com/uk/download/brochures/Daxten%20Best%20Practices%20DC%20Cooling_UK_2014.pdf> visited on May 20, 2016. (8 pages).
(Continued)

*Primary Examiner* — Cuong B Nguyen
*Assistant Examiner* — Samuel Park
(74) *Attorney, Agent, or Firm* — Finnegan, Henderson, Farabow, Garrett & Dunner LLP

(57) ABSTRACT

Disclosed is a system for facilitating homogenized distribution of airflow, generated from one or more cooling units, in a data center. The virtual data center creation module for creating a virtual environment of the data center. The airflow channel determination module for dividing the architectural layout into one or more partitions to determine one or more airflow channels corresponding to each of the one or more partitions. The CRAC placement module for positioning the at least one cooling unit in an airflow channel, of the one or more airflow channels, in a manner such that the airflow moves in a streamline manner within the airflow channel. The vein determination module for determining position of each of a plurality of veins inside the airflow channel. The vein shape determination module for determining shape of each vein that facilitates the homogenized distribution of the airflow.

7 Claims, 6 Drawing Sheets

(51) Int. Cl.
*F24F 11/62* (2018.01)
*G06F 17/50* (2006.01)
*G05B 17/02* (2006.01)
*G05D 7/06* (2006.01)

(56) References Cited

U.S. PATENT DOCUMENTS

| | | | | |
|---|---|---|---|---|
| 2011/0083824 | A1* | 4/2011 | Rogers | H05K 7/20745 165/80.2 |
| 2012/0071992 | A1 | 3/2012 | VanGilder et al. | |
| 2014/0014292 | A1* | 1/2014 | Rice | H05K 7/20745 165/11.1 |
| 2014/0122033 | A1* | 5/2014 | VanGilder | G06F 17/5009 703/2 |
| 2015/0142393 | A1* | 5/2015 | van den Berghe | G06F 17/5004 703/1 |
| 2016/0188764 | A1* | 6/2016 | VanGilder | G06F 17/5009 703/2 |

OTHER PUBLICATIONS

Karki, K.C. et al. (2003). "Techniques for Controlling Airflow Distribution in Raised-Floor Data Centers," *Proceedings of IPACK03 The Pacific Rim/ASME International Electronic Packaging Technical Conference and Exhibition*, Maui, HI; 8 pages.

\* cited by examiner

SYSTEM AND METHOD FOR FACILITATING HOMOGENIZED DISTRIBUTION OF AIRFLOW IN A DATA CENTER

PRIORITY CLAIM

This U.S. patent application claims priority under 35 U.S.C. § 119 to India Application No. 246/MUM/2015, filed on 23 Jan., 2015. The entire content of the aforementioned application are incorporated herein by reference.

TECHNICAL FIELD

The present disclosure in general, relates to thermal management in data centers. More particularly, the present disclosure relates to system(s) and method(s) for facilitating homogenized distribution of airflow in a data center.

BACKGROUND

At present data center is cooled by traditional computer room air conditioner (CRAC) units deployed in the data center. Since the data center is deployed with expensive Information technology (IT) equipment's (such as servers), which are continuously running, each IT equipment requires sufficient amount of airflow in order to reduce the heat generated due to the continuous running of each equipment. The heat may be reduced by distributing the airflow in the data center via the CRAC units. The distribution of airflow lot depends on the placement of the CRAC units as well as the air distribution system in the data center.

Currently, the placement of the CRAC units is done in an ad-hoc fashion or lumped calculations which usually leads to non-uniform distribution of the airflow inside the data center. It may be understood that the lumped calculation is performed to determine the number of CRAC units required in the data center. The lumped calculation facilitates to estimate power to be consumed by the data center. Generally, the data center manager maintains the ratio of cooling capacity to power as 1.2 to 1.5. Therefore, based on the lumped calculation, the number of cooling unit may be determined by dividing the cooling capacity to rated capacity of each cooling unit. The non-uniform distribution of the airflow may sometimes lead to uneven cooling level of the IT equipment's. This is because, at few locations of the data center, the distribution of the airflow is sufficiently low. While, at other locations of the data center, the distribution of the airflow is substantially higher than the airflow required to reduce the heat generated by the IT equipment's. The phenomenon of uneven distribution of the airflow causes mixing of cool air with hot air near an inlet of racks servers which generally leads to formation of hot spots in the data center. The consequences of above practice is to make the ratio, of the airflow supplied to the airflow required, substantially higher which results in lower operational efficiency related to cooling the IT equipment. Moreover, in the current state of the art, the CRAC units positioned at a particular location in the data center may not be able to provide airflow to farther locations of the data center. Since the airflow cannot be provided to the farther locations, the number of the CRAC units, supplying the airflow, may be increased in the data center than the actual CRAC units required in the data center. This increase in the CRAC units may result in increase in total capital expenditure and hence may escalate cost of setting up the data center.

SUMMARY

Before the present systems and methods, are described, it is to be understood that this disclosure is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for facilitating homogenized distribution of airflow, generated from one or more cooling units, in a data center, and the concepts are further described below in the detailed description. This summary is not intended to identify essential features of the disclosure nor is it intended for use in determining or limiting the scope of the disclosure.

Embodiments of the present disclosure represent the technological improvements as solutions to one or more of the above-mentioned technical problems recognized by the inventors in conventional systems. For example, in one implementation, a system for facilitating homogenized distribution of airflow, generated from one or more cooling units, in a data center is disclosed. In one aspect, the system may comprise a processor and a memory coupled to the processor. The processor may execute a plurality of modules present in the memory. The plurality of modules may comprise a virtual data center creation module, an airflow channel determination module, a CRAC placement module, a vein determination module, and a vein shape determination module. The virtual data center creation module may be employed for creating a virtual environment of the data center by importing an architectural layout of the data center. The airflow channel determination module may be employed for dividing the architectural layout into one or more partitions to determine one or more airflow channels corresponding to each of the one or more partitions. Each airflow channel may comprise at least one cooling unit of the one or more cooling units. The CRAC placement module may be employed for positioning the at least one cooling unit in an airflow channel, of the one or more airflow channels, in a manner such that the airflow moves in a streamlined manner within the airflow channel. The vein determination module may be employed for determining position corresponding to each of a plurality of veins inside the airflow channel. The position may be determined based on a length of the airflow channel and CFD simulation. It may be understood that the length of the airflow channel and CFD simulations results may facilitate to determine number of veins to be created in the airflow channel and the distance to be kept between two successive veins of the plurality of veins. The plurality of veins may distribute equal airflow, generated by the at least one cooling unit, inside the data center. The vein shape determination module may be employed for determining shape of each vein that facilitates the homogenized distribution of the airflow. The shape of each vein may be determined based on the CFD simulation.

In another implementation, a method for facilitating homogenized distribution of airflow, generated from one or more cooling units, in a data center is disclosed. In order to facilitate the homogenized distribution, initially, a virtual environment of the data center may be created by importing an architectural layout of the data center. Upon creating the virtual environment, the architectural layout may be divided into one or more partitions to determine one or more airflow channels corresponding to each of the one or more partitions. Each airflow channel may comprise at least one cooling unit of the one or more cooling units. Subsequent to the division of the architectural layout, the at least one cooling unit may be positioned in an airflow channel, of the one or more airflow channels, in a manner such that the airflow moves in a streamline manner within the airflow channel. After positioning the at least one cooling unit, position corresponding to each of a plurality of veins may be determined inside the airflow channel. The position may be determined based on a length of the airflow channel and CFD simulation. The plurality of veins may distribute equal airflow, generated by the at least one cooling unit, inside the data center. After determining the position, shape of each vein that facilitates the homogenized distribution of the airflow may be determined. The shape of each vein may be determined based on the CFD simulation. In one aspect, the aforementioned method for facilitating the homogenized distribution of the airflow in the data center is performed by a processor using programmed instructions stored in a memory.

In yet another implementation, non-transitory computer readable medium embodying a program executable in a computing device for facilitating homogenized distribution of airflow, generated from one or more cooling units, in a data center is disclosed. The program may comprise a program code for creating a virtual environment of the data center by importing an architectural layout of the data center. The program may further comprise a program code for dividing the architectural layout into one or more partitions to determine one or more airflow channels corresponding to each of the one or more partitions. Each airflow channel may comprise at least one cooling unit of the one or more cooling units. The program may further comprise a program code for positioning the at least one cooling unit in an airflow channel, of the one or more airflow channels, in a manner such that the airflow moves in a streamline manner within the airflow channel. The program may further comprise a program code for determining position corresponding to each of a plurality of veins inside the airflow channel. The position may be determined based on a length of the airflow channel and CFD simulation. The plurality of veins may distribute equal airflow, generated by the at least one cooling unit, inside the data center. The program may further comprise a program code for determining shape of each vein that facilitates the homogenized distribution of the airflow. The shape of each vein may be determined based on the CFD simulation.

BRIEF DESCRIPTION OF DRAWINGS

The foregoing summary, as well as the following detailed description of preferred embodiments, are better understood when read in conjunction with the appended drawing. For the purpose of illustrating the invention, there is shown in the drawing an exemplary construction of the invention, however, the invention is not limited to the specific methods and system illustrated.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
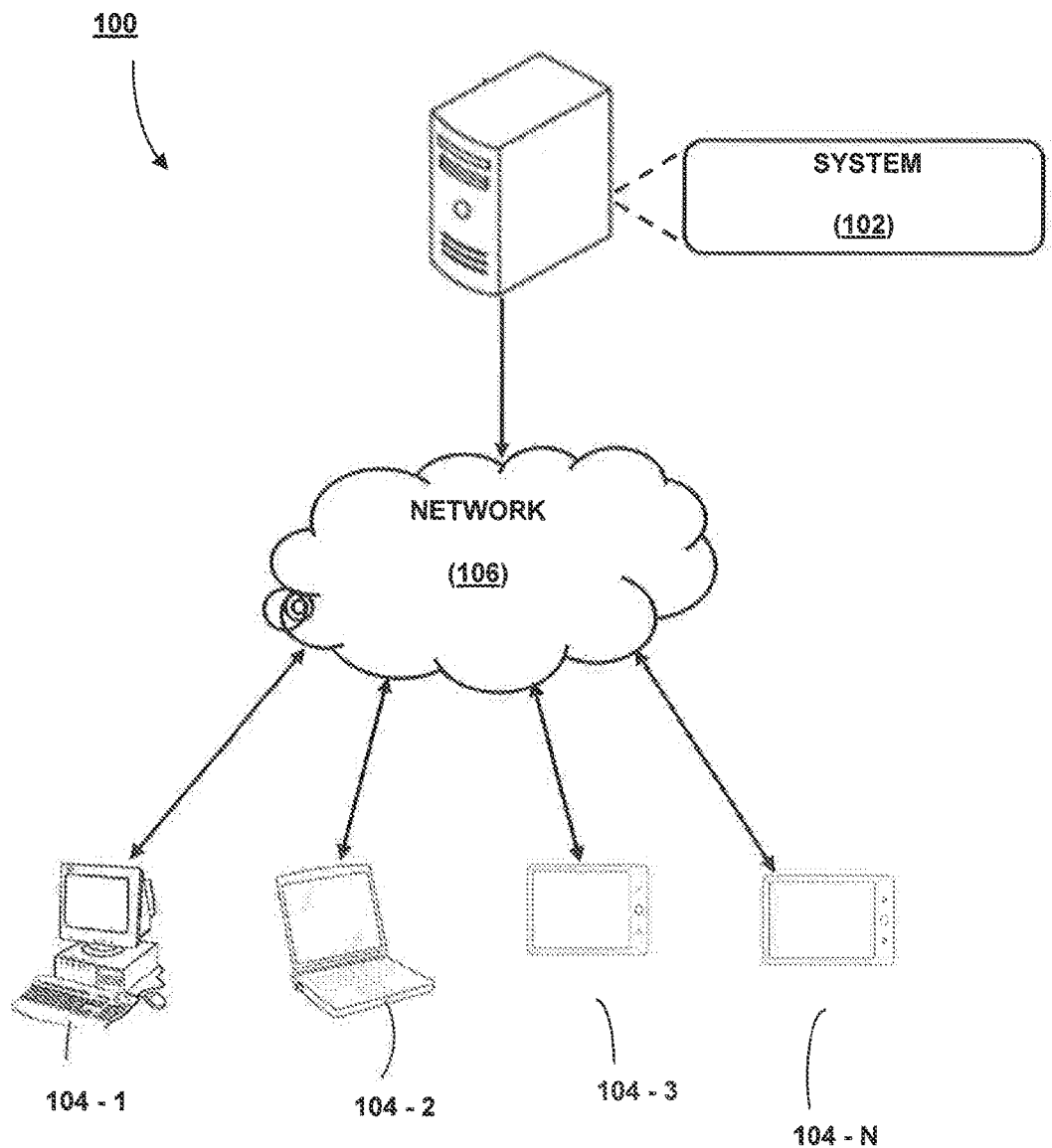
FIG. 1 illustrates a network implementation of a system for facilitating homogenized distribution of airflow, generated from one or more cooling units, in a data center is shown, in accordance with an embodiment of the present disclosure.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

System(s) and Method(s) for facilitating homogenized distribution of airflow, generated from one or more cooling units, in a data center are disclosed. The system and method facilitates to resolve a problem of uneven distribution of the airflow as identified in the existing art. In one aspect, the problem may be resolved based on a geometrical arrangement associated to the one or more cooling units, a plurality of veins, and an airflow channel. More specifically, the geometrical arrangement pertaining to the one or more cooling units indicates determining position of each cooing unit to be deployed in the airflow channel. Further the geometrical arrangement pertaining to the plurality of veins indicates position of each vein, distance between two successive veins, and shape of each vein deployed in the airflow channel.

In one embodiment, the geometrical arrangement for the one or more cooling units, the plurality of veins, and the airflow channel may be determined by, initially, creating a virtual environment of the data center. The virtual environment may be created by importing an architectural layout of the data center. Upon creating the virtual environment, the architectural layout may be divided into one or more partitions. In one embodiment, the architectural layout may be divided by considering a plurality of constraints. For example, each partition should be in rectangular shape. Further on each partition, each rack row should be oriented in a specific direction and the partition should divide the data center in smaller portion. In one aspect, the architectural layout may be divided to determine one or more airflow channels corresponding to each of the one or more partitions. In one aspect, each airflow channel may comprise at least one cooling unit of the one or more cooling units. It may be understood that the at least one cooling unit in the airflow channel may be positioned based on one or more constraints and requirements. Examples of the at least one constraints may include, but not limited to, wall column, pillar, number of racks and servers and thereby their heat generating power with the cooling capacity of the partition, and any other obstruction in the data center.

Upon dividing the architectural layout, the at least one cooling unit may be positioned in the airflow channel in a manner such that the airflow, generated by the at least one cooling unit, moves in a streamline manner within the airflow channel. Subsequently, the position corresponding to each of the plurality of veins may be determined inside the airflow channel. In one embodiment, the position corresponding to each vein is determined in a manner such that distance between each pair of successive veins, of the plurality of veins, is equal. Along with the determination of the position, the system may further facilitate to determine the shape of each vein. In one embodiment, the shape and the position may be determined by performing CFD simulations on varying shapes and positions and thereby comparing result of the CFD simulation with a pre-defined metrics in order to select a specific position and a specific shape from varying the shapes and the positions. The specific position and the specific shape may then be implemented in the data center to facilitate the homogenized distribution of the airflow.

While aspects of described system and method for facilitating the homogenized distribution of the airflow in the data center may be implemented in any number of different computing systems, environments, and/or configurations, the embodiments are described in the context of the following exemplary system.

Referring now to FIG. 1, a network implementation 100 of a system, hereinafter referred to as a system 102, for facilitating homogenized distribution of airflow, generated from one or more cooling units, in a data center is disclosed. In one embodiment, the system 102 initially, creates a virtual environment of the data center by importing an architectural layout of the data center. The system 102 may further divide the architectural layout into one or more partitions to determine one or more airflow channels corresponding to each of the one or more partitions. Each airflow channel may comprise at least one cooling unit of the one or more cooling units. The system 102 may further position the at least one cooling unit in an airflow channel, of the one or more airflow channels, in a manner such that the airflow moves in a streamline manner within the airflow channel. The system 102 may further determine position corresponding to each of a plurality of veins inside the airflow channel. The position may be determined based on a length of the airflow channel and CFD simulation. The plurality of veins may distribute equal airflow, generated by the at least one cooling unit, inside the data center. The system 102 may further determine shape of each vein that facilitates the homogenized distribution of the airflow. The shape of each vein may be determined based on the CFD simulation.

Although the present disclosure is explained considering that the system 102 is implemented on a server, it may be understood that the system 102 may also be implemented in a variety of computing systems, such as a laptop computer, a desktop computer, a notebook, a workstation, a mainframe computer, a network server, a cloud-based computing environment. It will be understood that the system 102 may be accessed by multiple users through one or more user devices 104-1, 104-2 . . . 104-N, collectively referred to as user 104 hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
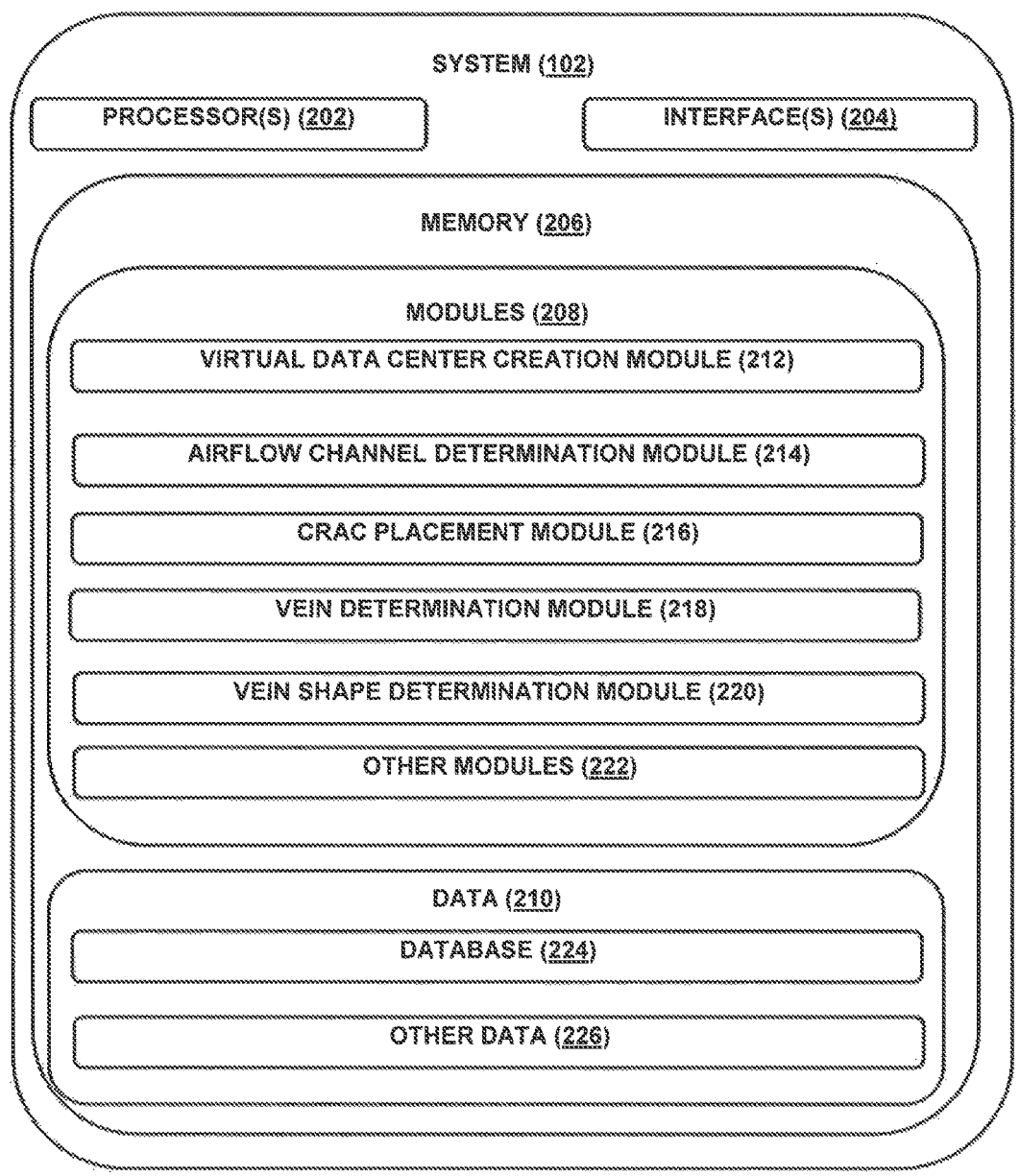
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a virtual data center creation module 212, an airflow channel determination module 214, a CRAC placement module 216, a vein determination module 218, a vein shape determination module 220, and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a database 224 and other data 226. The other data 226 may include data generated as a result of the execution of one or more modules in the other modules 222.

In one implementation, at first, a user may use the client devices 104 to access the system 102 via the I/O interface 204. The user may register themselves using the I/O interface 204 in order to use the system 102. In one aspect, the user may accesses the I/O interface 204 of the system 102 for facilitating homogenized distribution of airflow in a data center. In order to facilitate the homogenized distribution of the airflow, the system 102 may employ the plurality of modules i.e. the virtual data center creation module 212, the airflow channel determination module 214, the CRAC placement module 216, the vein determination module 218, and the vein shape determination module 220. The detailed working of the plurality of modules is described below.

Further referring to FIG. 2, the system 102 for facilitating homogenized distribution of airflow, generated from one or more cooling units, in a data center is disclosed. In one aspect, the homogenized distribution of airflow may be facilitated based on a geometrical arrangement associated to the one or more cooling units, a plurality of veins, and an airflow channel. More specifically, the geometrical arrangement pertaining to the one or more cooling units indicates determining position of each cooing unit to be deployed in the airflow channel. Further the geometrical arrangement pertaining to the plurality of veins indicates position of each vein, distance between two successive veins, and shape of each vein deployed in the airflow channel.

Figure 3:
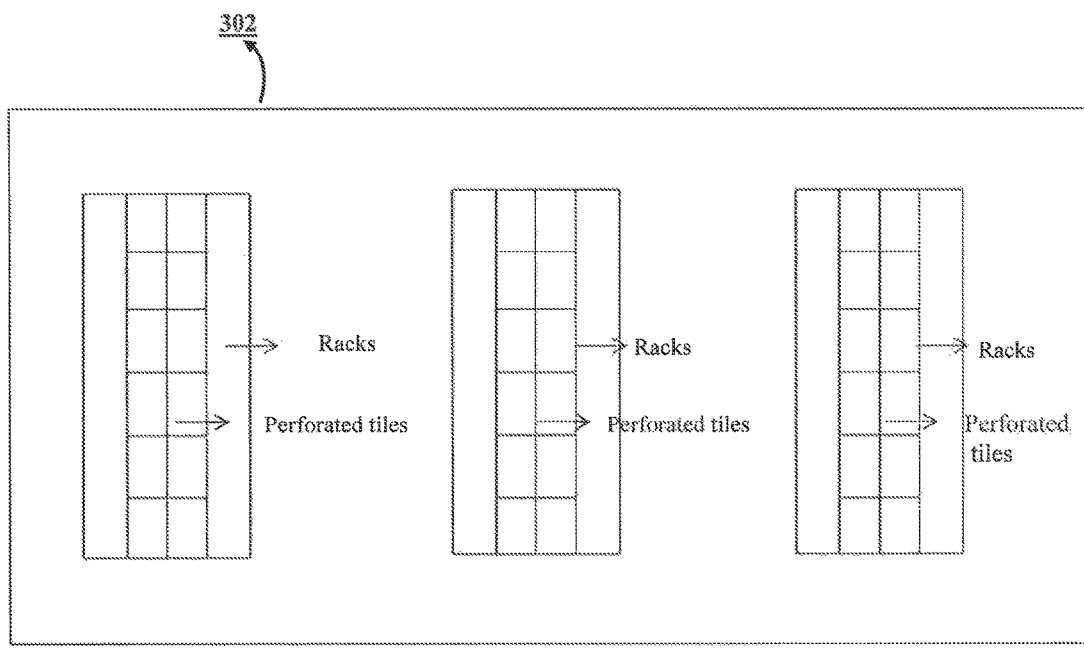
FIGS. 3, 4 and 5 illustrate an example, in accordance with an embodiment of the present disclosure.

In order to determine the geometrical arrangement associated to the one or more cooling units, the plurality of veins, and the airflow channel, initially, the virtual data center creation module 212 may create a virtual environment of the data center. The virtual environment may be created by importing an architectural layout of the data center. In one example, the architectural layout 302 of the data center is illustrated in FIG. 3. The virtual data center creation module 212 imports the architectural layout 302. The architectural layout 302 may comprise perforated tiles and racks, servers, and other geometrical features like column, fire extinguisher layout, cable arrangement and the like deployed at different locations of the data center.

Upon importing the architectural layout of the data center, the airflow channel determination module 214 processes the architectural layout in order to divide the architectural layout into one or more partitions. In one embodiment, the airflow channel determination module 214 imports the architectural layout of the data center. In one aspect, the architectural layout may be divided to determine one or more airflow channels corresponding to each of the one or more partitions. It may be understood that each airflow channel may comprise at least one cooling unit, of the one or more cooling units.

Figure 4:
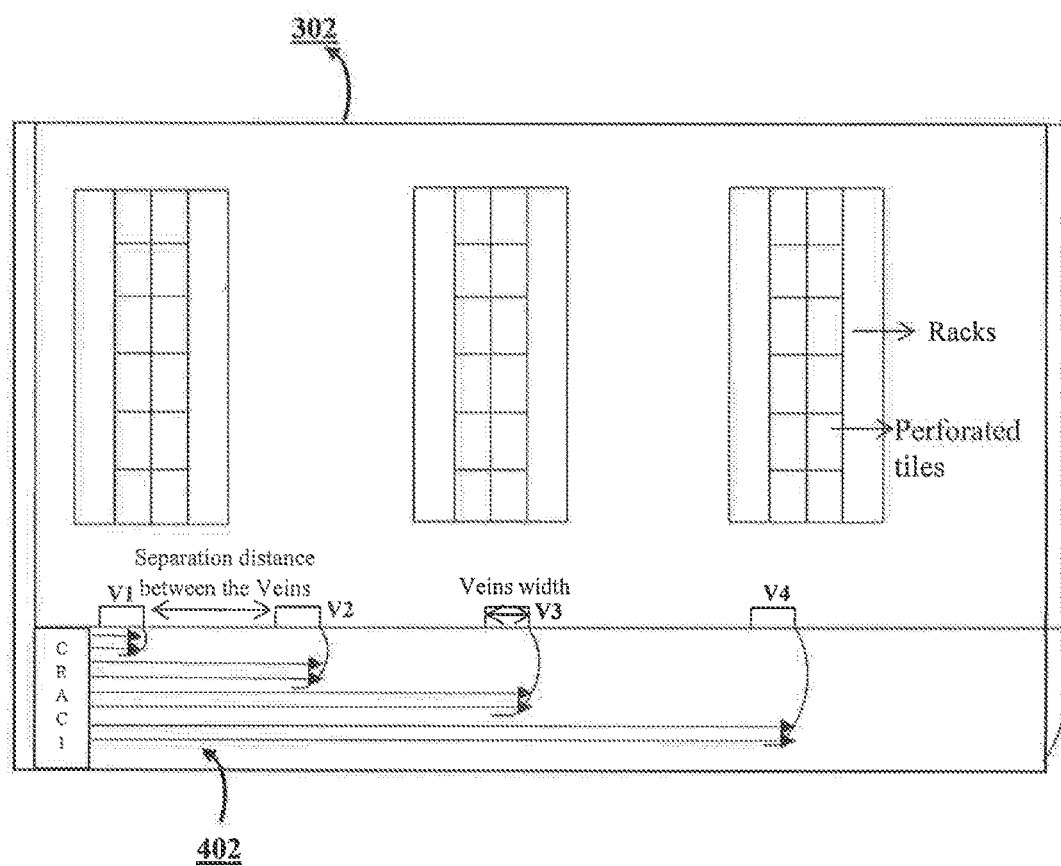

Subsequent to the determination of the one or more airflow channels, the CRAC placement module 216 positions the at least one cooling unit in an airflow channel of the one or more airflow channels based on one or more constraints. Examples of the one or more constraints may include, but not limited to, wall, column, pillar or any other obstruction. In one aspect, the at least one cooling unit may be positioned in a manner such that the airflow moves in a streamline manner within the airflow channel. In order to understand the functioning of the CRAC placement module 216, consider an example where the airflow channel 402 is determined for architectural layout 302 of the data center as illustrated in FIG. 4. Once the airflow channel 402 is determined, the CRAC placement module 216 positions a CRAC 1 (a cooling unit) in the airflow channel 402 as shown in FIG. 4. As shown in the FIG. 4, the CRAC 1 positioned in a manner such that the airflow moves in a streamline manner within the airflow channel 402.

Once the at least one cooling unit is positioned in the airflow channel, the vein determination module 218 determines position corresponding to each of the plurality of veins inside the airflow channel. In one aspect, the position may be determined based on length of the airflow channel. It may be understood that the length of the airflow channel and CFD simulations results may further facilitate to determine number of veins to be created in the airflow channel and the distance to be kept between two successive veins of the plurality of veins. In order to understand the determination of the number of veins, consider an example where the length of the airflow channel is 10 meters. In order to determine the number of veins to be created in the airflow channel, consider the distance to be kept between two successive veins is 2 meters. Therefore the number of veins to be created in the airflow channel is 5. Thus based on the length of the airflow channel, position of each vein in the airflow channel is determined (i.e. after every 2 meters, a vein is positioned in the airflow channel). The position may further be determined by performing CFD simulation on varying positions corresponding to each vein in the airflow channel 402. Upon performing the CFD simulation, a specific position corresponding to each vein may be determined that facilitates to distribute the airflow inside the data center in homogenized manner. In one aspect, the plurality of veins positioned at the specific position may distribute equal airflow, generated by the at least one cooling unit, inside the data center. In one embodiment, the position corresponding to each vein is determined in a manner such that distance between each pair of successive veins, of the plurality of veins, is equal.

After determining the position of each vein, the vein shape determination module 220 determines shape of each vein. The shape of each vein may include vein extension towards the airflow channel as well as geometry of each vein outside the airflow channel. In one aspect, the shape of each vein may be determined by carrying out the CFD simulation with different shapes of vein. Since each shape may alter the distribution of the airflow inside the data center, result of the CFD simulation performed on each distinct shape is stored in the database 224. In order to determine an optimal shape of each vein, the vein shape determination module 220 compares the result of the CFD simulation with a pre-defined metrics for homogenized airflow distribution in the data center and making sure that turbulence at the vein extension portion towards the airflow channel is zero or absent and the airflow moves in a stream line flow manner. The pre-defined metrics may comprise variation of the airflow at each vein outlet from an average airflow distributed from each vein. In other words, the pre-defined metrics for homogenization includes variability of the airflow at the vein from the average airflow distributed from the vein. In one embodiment, the variability may be calculated from the difference between velocities of the airflow, distributed from the plurality of veins, from an average velocity of the airflow. In one example, consider average of airflow velocity, distributed from a plurality of veins, is 1.6 m/s. Then in such a scenario, the pre-defined metric may be a standard deviation for the vein velocity having a value≤5 indicating the variation of the airflow velocity of each vein from the average airflow velocity (i.e. 1.6 m/s). Therefore, by maintaining the standard deviations for the plurality of veins, the airflow velocity within limit may result in the homogenization of the airflow. Based on the comparison, a specific shape may be determined that facilitates to distribute the airflow inside the data center in the homogenized manner. In one embodiment, the position of each vein and the shape of each vein may be tuned based on the results of the CFD simulation.

Figure 5:
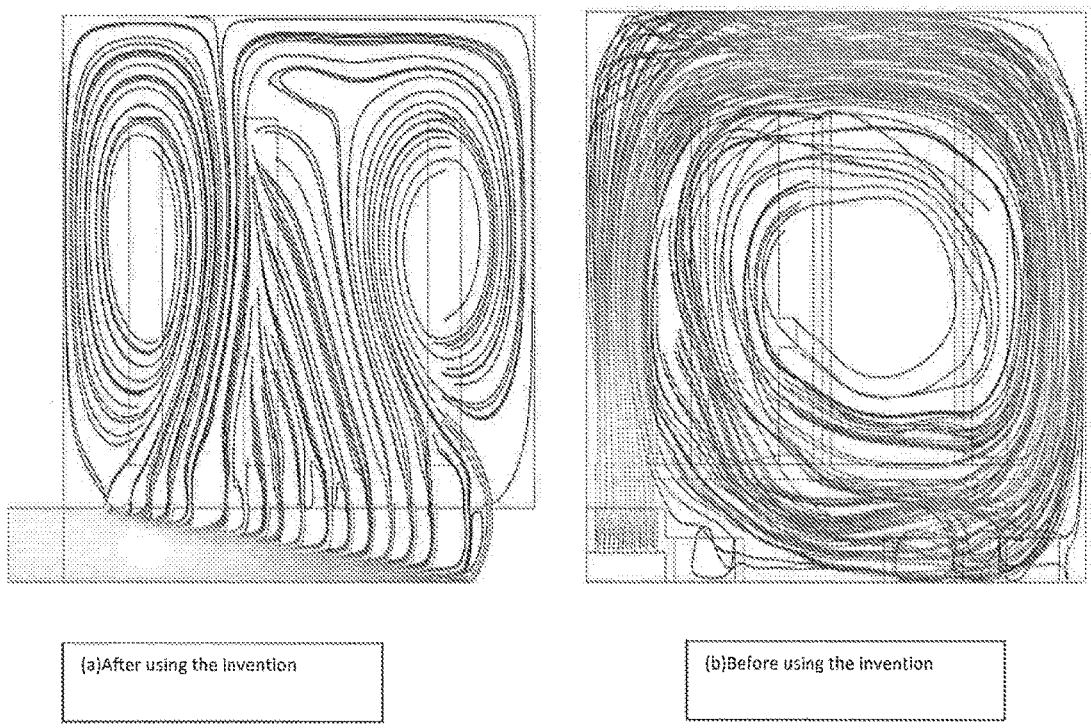

Further referring to FIG. 4, the architectural layout 302 of the data center, an airflow channel 402 for the data center, a cooling unit (CRAC 1), and position of a plurality of veins (i.e. V1, V2, V3, and V4) are illustrated. The CRAC 1 is positioned in the airflow channel 402 in a manner such that the airflow moves in a streamline manner within the airflow channel. The FIG. 4 further illustrate the geometrical arrangement associated to the cooling units (CRAC 1), the plurality of veins (V1, V2, V3, and V4), and the airflow channel 402. It may be understood that the geometrical arrangement may be determined based on the CFD simulation. Upon implementing the geometrical arrangement associated to the cooling units, the plurality of veins and the airflow channel in the actual data center, the airflow is distributed in the homogenized manner in the data center. As illustrated in FIG. 5(a), after implementing the geometrical arrangement as determined based on the CFD simulation, the airflow is distributed uniformly across different locations of the data center. On the other hand, FIG. 5(b) illustrates non-uniform distribution of airflow across the different locations of the data center before implementing the geometrical arrangement determined based on the CFD simulation as described above. Thus, in this manner, the homogenized distribution of airflow may be facilitated in the data center.

Figure 6:
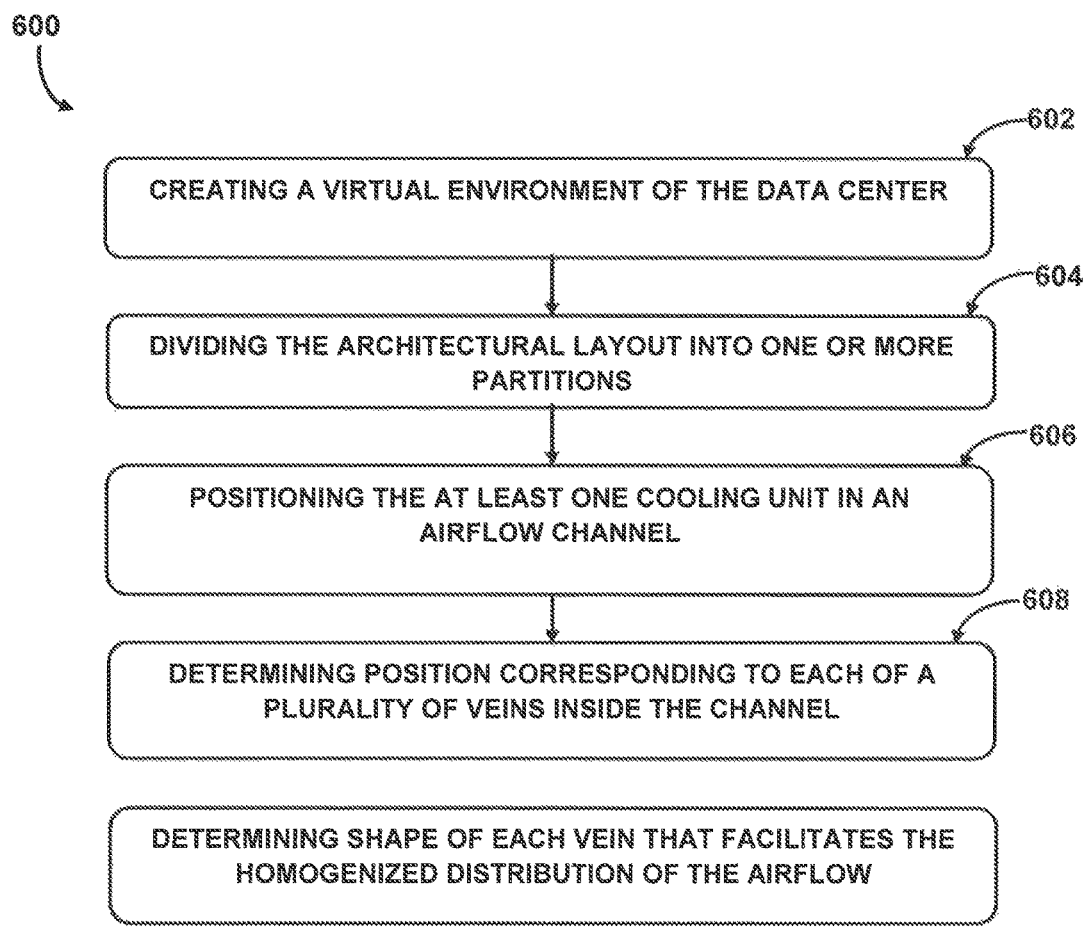
FIG. 6 illustrates a method for facilitating the homogenized distribution of the airflow, generated from the one or more cooling units, in the data center, in accordance with an exemplary embodiment of the disclosure.

Referring now to FIG. 6, a method 600 for facilitating homogenized distribution of airflow, generated from one or more cooling units, in a data center is shown, in accordance with an embodiment of the present disclosure. The method 600 may be described in the general context of computer executable instructions. Generally, computer executable instructions can include routines, programs, objects, components, data structures, procedures, modules, functions, etc., that perform particular functions or implement particular abstract data types. The method 600 may be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the disclosure described herein. Furthermore, the method can be implemented in any suitable hardware, software, firmware, or combination thereof. However, for ease of explanation, in the embodiments described below, the method 600 may be considered to be implemented in the above described in the system 102.

At block 602, a virtual environment of the data center may be created by importing an architectural layout of the data center. In one implementation, the virtual environment of the data center may be created by the virtual data center creation module 212.

At block 604, the architectural layout may be divided into one or more partitions to determine one or more airflow channels corresponding to each of the one or more partitions. It may be understood that each airflow channel may comprise at least one cooling unit of the one or more cooling units. In one implementation, the architectural layout may be divided by the airflow channel determination module 214.

At block 606, the at least one cooling unit in an airflow channel may be positioned in a manner such that the airflow moves in a streamline manner within the airflow channel. In one implementation, the at least one cooling unit in an airflow channel may be positioned by the CRAC placement module 216.

At block 608, position corresponding to each of a plurality of veins may be determined inside the airflow channel. In one aspect, the position may be determined based on a length of the airflow channel and CFD simulation. In one aspect, the distance between two successive veins may be determined based on the length of the airflow channel and using CFD simulations results for different cases after varying the distance between the two successive veins. In one aspect, the plurality of veins may distribute equal airflow, generated by the at least one cooling unit, inside the data center. In one implementation, the position corresponding to each of a plurality of veins may be determined by the vein determination module 218.

At block 610, shape of each vein that facilitates the homogenized distribution of the airflow may be determined. In one aspect, the shape of each vein may be determined based on the CFD simulation. In one implementation, the shape of each vein that facilitates the homogenized distribution of the airflow may be determined by the vein shape determination module 220.

Exemplary embodiments discussed above may provide certain advantages. Though not required to practice aspects of the disclosure, these advantages may include those provided by the following features.

Some embodiments enable a system and a method to facilitate to reduce the number of redundant CRAC units required in the data center.

Some embodiments enable a system and a method to position veins in the airflow channel in a way to homogenize the airflow inside the data center.

Although implementations for methods and systems for facilitating homogenized distribution of airflow, generated from one or more cooling units, in a data center have been described in language specific to structural features and/or methods, it is to be understood that the appended claims are not necessarily limited to the specific features or methods described. Rather, the specific features and methods are disclosed as examples of implementations for facilitating the homogenized distribution of the airflow in the data center, with a true scope and spirit of disclosed embodiments being indicated by the following claims.

What is claimed is:

1. A processor-implemented method for facilitating homogenized distribution of airflow, generated from one or more cooling units, in a data center, the method comprising:

creating, by a processor, a virtual environment of the data center by importing an architectural layout of the data center;

dividing, by the processor, the architectural layout into one or more partitions to determine one or more airflow channels corresponding to each of the one or more partitions, wherein each airflow channel comprises at least one cooling unit of the one or more cooling units;

positioning, by the processor, the at least one cooling unit in an airflow channel, of the one or more airflow channels, in a manner such that the airflow moves in a streamline manner within the airflow channel;

determining, by the processor, position of each of a plurality of veins inside the airflow channel, wherein the position is determined based on a length of the airflow channel and CFD simulation, wherein the plurality of veins distributes equal airflow, generated by the at least one cooling unit, inside the data center and wherein the position of each of the plurality of veins is determined by maintaining equal distance between two successive veins of the plurality of veins; and determining, by the processor, shape of each vein that facilitates the homogenized distribution of the airflow, wherein the shape of each vein is determined based on the CFD simulation, wherein the shape of each vein includes vein extension towards the airflow channel and geometry of each vein outside the airflow channel, wherein results of the CFD simulation are compared with pre-defined metrics for the homogenized distribution of the airflow in the data center, thereby turbulence at each vein extension portion towards the airflow channel is zero and the airflow moves in a stream line flow manner and wherein the pre-defined metrics comprises variability of the airflow at each vein from an average airflow distributed from the corresponding vein.

2. The method of claim 1, wherein the at least one cooling unit in the airflow channel is positioned based on one or more constraints comprising wall column, pillar or any other obstruction in the data center.

3. The method of claim 1 further comprising tuning the position of each vein and the shape of each vein based on the results of the CFD simulation.

4. The method of claim 1, wherein the CFD simulation is performed on different shapes of a vein of the plurality of veins and different positions of the vein in order to select the shape and the position for the vein from the different shapes and the different positions respectively.

5. A system for facilitating homogenized distribution of airflow, generated from one or more cooling units, in a data center, the system comprising:

a processor; and a memory coupled to the processor, wherein the processor is capable of executing a plurality of modules stored in the memory, and wherein the plurality of modules comprising:

a virtual data center creation module for creating a virtual environment of the data center by importing an architectural layout of the data center;

an airflow channel determination module for dividing the architectural layout into one or more partitions to determine one or more airflow channels corresponding to each of the one or more partitions, wherein each airflow channel comprises at least one cooling unit of the one or more cooling units;

a CRAC placement module for positioning the at least one cooling unit in an airflow channel, of the one or more airflow channels, in a manner such that the airflow moves in a streamline manner within the airflow channel;

a vein determination module for determining position of each of a plurality of veins inside the airflow channel, wherein the position is determined based on a length of the airflow channel and CFD simulation, wherein the plurality of veins distributes equal airflow, generated by the at least one cooling unit, inside the data center and wherein the position of each of the plurality of veins is determined by maintaining equal distance between two successive veins of the plurality of veins; and a vein shape determination module for determining shape of each vein that facilitates the homogenized distribution of the airflow, wherein the shape of each vein is determined based on the CFD simulation, wherein the shape of each vein includes vein extension towards the airflow channel and geometry of each vein outside the airflow channel, wherein results of the CFD simulation are compared with pre-defined metrics for the homogenized distribution of the airflow in the data center, thereby turbulence at each vein extension portion towards the airflow channel is zero and the airflow moves in a stream line flow manner and wherein the pre-defined metrics comprises variability of the airflow at each vein from an average airflow distributed from the corresponding vein.

6. The system of claim 5, wherein the at least one cooling unit in the airflow channel is positioned based on one or more constraints comprising wall column, pillar or any other obstruction in the data center.

7. A non-transitory computer readable medium embodying a program executable in a computing device for facilitating homogenized distribution of airflow, generated from one or more cooling units, in a data center, the program comprising a program code:

a program code for creating a virtual environment of the data center by importing an architectural layout of the data center;

a program code for dividing the architectural layout into one or more partitions to determine one or more airflow channels corresponding to each of the one or more partitions, wherein each airflow channel comprises at least one cooling unit of the one or more cooling units;

a program code for positioning the at least one cooling unit in an airflow channel, of the one or more airflow channels, in a manner such that the airflow moves in a streamline manner within the airflow channel;

a program code for determining position of each of a plurality of veins inside the airflow channel, wherein the position is determined based on a length of the airflow channel and CFD simulation, wherein the plurality of veins distributes equal airflow, generated by the at least one cooling unit, inside the data center and wherein the position of each of the plurality of veins is determined by maintaining equal distance between two successive veins of the plurality of veins; and a program code for determining shape of each vein that facilitates the homogenized distribution of the airflow, wherein the shape of each vein is determined based on the CFD simulation, wherein the shape of each vein includes vein extension towards the airflow channel and geometry of each vein outside the airflow channel, wherein results of the CFD simulation are compared with pre-defined metrics for the homogenized distribution of the airflow in the data center, thereby turbulence at each vein extension portion towards the airflow channel is zero and the airflow moves in a stream line flow manner and wherein the pre-defined metrics comprises variability of the airflow at each vein from an average airflow distributed from the corresponding vein.

* * * * *